July 22, 1969     H. SEIFERTH     3,457,004

ADJUSTABLE SLIT CONTROL FOR SPECTROSCOPIC APPARATUS

Filed May 21, 1964

INVENTOR

BY *Heinz Seiferth*

ATTORNEY

United States Patent Office 3,457,004
Patented July 22, 1969

3,457,004
ADJUSTABLE SLIT CONTROL FOR
SPECTROSCOPIC APPARATUS
Heinz Seiferth, Zollnitz, Germany, assignor to
VEB Carl Zeiss Jena, Jena, Germany
Filed May 21, 1964, Ser. No. 369,331
Int. Cl. G02f 1/30
U.S. Cl. 350—271                    1 Claim

ABSTRACT OF THE DISCLOSURE

A spectrophotometer has a slit carrier and a device selecting radiation wavelengths. The selecting device and the slit carrier are interconnected by a lever mechanism which in a simple manner transmits the motion of said device to the slit jaws. A rod between two levers of the lever mechanism is longitudinally and transversely displaceable and, depending on its position relative to the two levers, enables the transmission of motion to be stepped up and down.

---

Figure 1:
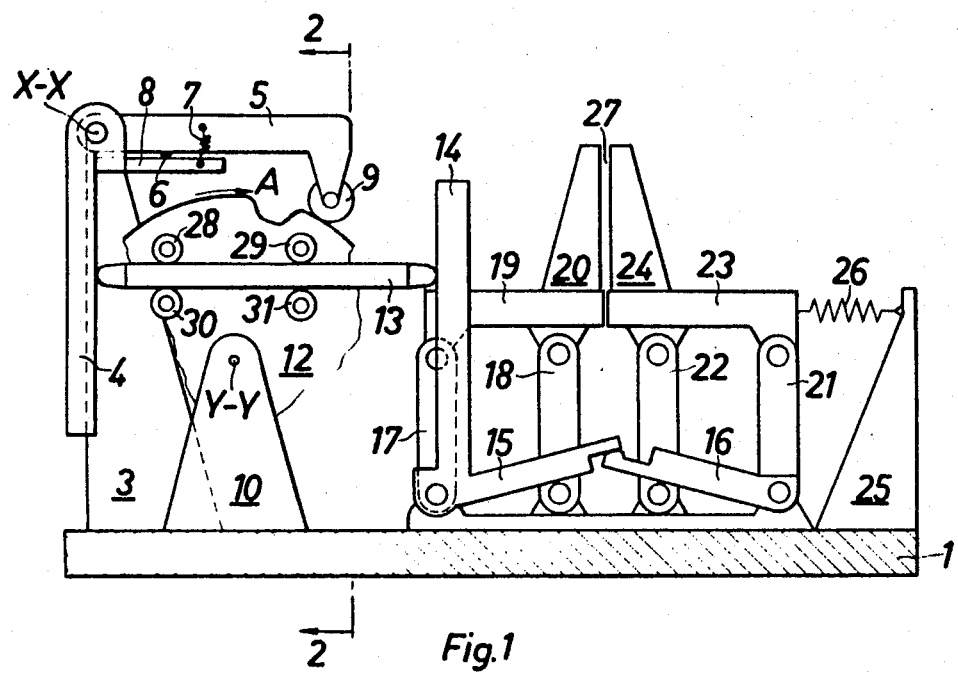

Correct setting of spectrophotometers to maximum service condition depends on the resolving power as a measure of band separation, the accuracy as a factor of reliability, and the recording velocity inclusive of the time required for obtaining the spectrum proper, but exclusive of the time for preparation and other preliminaries. The resolving power A within certain limits is in inverse ratio to the breadth of the monochromator slit on which depends the radiation energy emanating from the monochromator and accordingly the signal for the control circuit. On the other hand, the accuracy G (accuracy of reading, steadiness in recording) of the spectrophotometer is increased by an increase in the radiation receiver of the ratio of signal deflection to noise level. The time required for obtaining the spectrum is shortened by an increase of the recording velocity R. As is well known, the said three factors, resolving power A, accuracy G, and recording velocity R, depend on the empirically ascertained relation $$A^2 \cdot G \cdot R = \text{constant}$$

If two of these factors are known in advance, also the third factor is determined and cannot freely be selected. For example, if the resolving power is great, the accuracy at the same recording velocity is small. Measures must therefore be taken to ensure for a definite examination a maximum setting of all factors or, if two factors are given, to adapt the maximum of the third factor to the two others.

In all modern spectrophotometers, the control of the width of the slit is coupled in precise manner to the device for selecting the radiation wavelength concentrated at the entrance slit and is carefully adapted to correspond to the emission curve of the light source and the dispersion curve of the splitting-up means. Coupling is either purely mechanical by means of a cam disc or electric by means of a potentiometer and a control circuit.

For maximum setting of the width of the slit, that is to say for changing the slit-width program, the slit carrier is coupled in known manner by step-up or step-down means to the device for selecting the radiation wavelength. If such coupling is mechanical, a plurality of differently dimensioned cam discs are disposed in known manner on an axle, by the displacement of which they can be interchanged. Apart from the inconvenience that displacing the cam discs along the axle or displacing the axle together with the cam discs gives rise to considerable transmission errors, the precision manufacture of a plurality of cam discs is rather costly and, moreover, only a restricted number of programs can be set according to the number of cam discs available. If coupling is electric or electronic or electromechanical, the slit-width programs can be set continuously, but the respective setting device is bulky, complicated and liable to break down and thus very costly.

The present invention aims at overcoming the foregoing disadvantages and has for an object the provision of a spectrophotometer in which the slit-breadth setting device through the medium of a cam disc and a lever rotatable parallel to the plane of displacement of the slit-jaws, is changeably coupled to the device for selecting the radiation wavelength concentrated at the exit slit, the two ends of this lever acting respectively on the cam disc and on at least one of the slit-jaws.

To this end the invention consists in a spectrophotometer characterized by a rod which is longitudinally and transversely displaceable in the plane of rotation of the lever and the two ends of which contact respectively the lever and the carrier of a slit-jaw, the contact surfaces of lever and carrier being parallel to each other in zero position. The spectrophotometer according to the invention combines the advantages, but does not have the disadvantages, of the known instruments of this kind. It is simple and compact in construction and permits the setting of any slit-breadth program.

It is advisable to connect to one slit-jaw carrier a lever by means of which the rod acts on one or both slit-jaws, so that the cam disc can be contacted also if the magnification range is increased.

Figure 2:
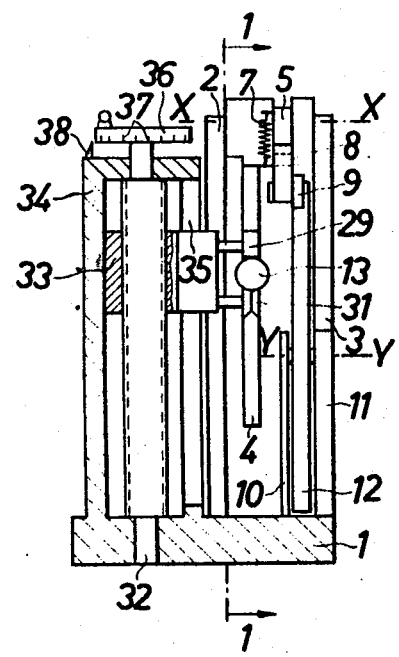

In order that the invention may be more readily understood, reference is made to the accompanying drawings which are given by way of example and in which FIG. 1 illustrates schematically the slit-operating parts of a spectrophotometer according to the invention in a longitudinal section through line 1—1 in FIG. 2 and FIG. 2 shows schematically a transverse section through line 2—2 in FIG. 1.

A base plate 1 supports two vertical plates 2 and 3 in which a bell-crank lever having legs 4 and 5 is mounted for rotation about an axis X—X, the legs 4 and 5 enclosing a slightly variable angle. The lower side of the leg 5 has a lug 6 which a spiral spring 7 urges against a stop 8 connected to the leg 4. The free end of the leg 5 has a roller 9 running on a cam disc 12 the shape of which is determined by the (not shown) dispersion means used. The cam disc 12 is rotatable in the direction of an arrow A about an axis Y—Y in bearings 10, 11 fast with the base plate 1.

The leg 4 presses against a rod 13, which is displaceable along its longitudinal axis. The rod 13 acts against a leg 14 of a bell-crank lever rotatably mounted on the base plate 1. The other leg 15 of said bell-crank lever contacts a lever 16. Both the bell-crank lever 14, 15 and the lever 16 are rotatable about axes parallel to the axes X—X and Y—Y. The bell-crank lever 14, 15 is rigidly connected to a lever system 17, 18 which is linked to the base plate 1 and to the carrier 19 of a slit-jaw 20. In quite the same manner a lever system 21, 22 connects a carrier 23 of a slit-jaw 24 to the base plate 1 and is fixed to the lever 16. The lever systems ensure parallel movement of the slit-jaws 20 and 24. A spiral spring 26 held by a bracket 25 and the slit-jaw carrier 23 imparts to a slit 27 the urge to widen.

The rod 13 instead of operating the two slit-jaws 20 and 24 by means of the levers 14, 15, 16, may be in direct working contact with the carrier 19 of the slit-jaw 20, spring pressure urging this jaw against the respective end of the rod 13. The slit-jaw 24 and its carrier 23 must in this case be rigidly connected to the base plate 1, and the levers 14, 15, 16 can be dispensed with.

The displacement of the rod 13 along its longitudinal axis is secured by a roller bearing made up of two cylindrical rollers 28 and 29 and two double-cone rollers 30 and 31. The double-cone rollers 30 and 31 are supported by a nut 33 in mesh with a spindle 32. The one end of the spindle 32 is mounted in the base plate 1 and the other end of the spindle 32 is mounted in a bearing body 34, which contains a straight guide 35 for the nut 33. The said other end of the spindle 32 is fast with a hand wheel 36 having a circumferential division 37 which cooperates with a mark 38 fast with the base plate 1.

Rotating the hand wheel 36 displaces the nut 33 by means of the spindle 32 in the guide 35, and, accordingly, displaces the rod 13 in transverse direction. In consequence thereof, the movement of the bell-crank lever 4, 5 is transmitted at a changed transmission ratio to the bell-crank lever 14, 15, the lever 16 and, accordingly, to the slit-jaws 20 and 24.

The breadth of the slit 27 regardless of the positions of the jaws 20 and 24 relative to each other can be secured by means not shown in the drawing. In consequence thereof also the leg 4 can be clamped in any desired position. To prevent movements of the cam disc 12 from causing self-locking or damage to the apparatus, the leg 5 is elastically connected to the leg 4 by means of the lug 6, the spiral spring 7 and the stop 8.

I claim:
1. An adjustable slit control for spectroscopic apparatus, comprising
    a base plate,
    a cam disc rotatably mounted on said base plate,
    two juxtaposed carriers,
    at least one lever system,
        at least one of said carriers being linked by said lever system to said base plate and displaceable in a plane parallel to said cam disc,
    two slit jaws respectively connected to said carriers,
    a lever mechanism contacting said cam disc and transmitting the contact values to said at least one of said carriers,
        said lever mechanism comprising at least three levers rotatable about two axes at right angles to said cam disc,
        the first of said three levers with its free end contacting said cam disc and together with the second of said three levers being rotatable about one of said axes,
        said first and said second lever being substantially in fixed angular relation to each other,
        the third of said three levers being fast with the displaceable carrier and rotatable about the other of said axes,
        said second and said third lever when in zero position being parallel to each other,
    a stop secured to said second lever,
    a first spring connected to said first lever and said stop,
        said first spring urging said first lever against said stop,
    a second spring connected to said base plate and said one carrier,
        said second spring causing said first lever to contact said cam disc,
    a rod traverse to and in contact with those surfaces of said second and said third lever which face each other,
    a nut mounted on said base plate for displacement at right angles thereto and parallel to said cam disc,
    and a roller bearing for said rod,
        said bearing being fast with said nut,
        said rod being longitudinally displaceable in said bearing and transversely displaceable together with said nut,
        the displacements of said rod taking place in a plane parallel to the planes of rotation of said second and said third lever,
        and the axes of rotation of said second and said third lever being on either side of said rod.

References Cited

UNITED STATES PATENTS

| 2,227,510 | 1/1941 | Pineo. |
| 2,654,287 | 10/1953 | Luft. |
| 2,795,170 | 6/1957 | Hansen et al. _____ 350—271 |
| 3,116,415 | 12/1963 | Jones. |

FOREIGN PATENTS

| 618,527 | 9/1935 | Germany. |
| 973,256 | 9/1941 | France. |

RONALD L. WIBERT, Primary Examiner

V. P. McGRAW, Assistant Examiner